(12) United States Patent
Prescott

(10) Patent No.: US 7,634,872 B2
(45) Date of Patent: Dec. 22, 2009

(54) PLANT GROWTH CONTAINER

(76) Inventor: Mark R. Prescott, 58 Prescott Way, Stephentown, NY (US) 12168

( * ) Notice: Subject to any disclaimer, the term of this patent is extended or adjusted under 35 U.S.C. 154(b) by 126 days.

(21) Appl. No.: 10/991,815

(22) Filed: Nov. 18, 2004

(65) Prior Publication Data

US 2005/0120626 A1 Jun. 9, 2005

Related U.S. Application Data

(60) Provisional application No. 60/523,453, filed on Nov. 19, 2003.

(51) Int. Cl.
*A01G 9/02* (2006.01)
*A21B 1/22* (2006.01)
*A21B 1/00* (2006.01)

(52) U.S. Cl. .............. 47/86; 47/65.5; 219/407

(58) Field of Classification Search ........ 47/79, 47/80, 81; 206/423; 219/407
See application file for complete search history.

(56) References Cited

U.S. PATENT DOCUMENTS

| | | | | |
|---|---|---|---|---|
| 3,768,201 A | * | 10/1973 | Yoo ............... | 47/16 |
| 4,291,493 A | * | 9/1981 | Monson .......... | 47/14 |
| 4,291,494 A | * | 9/1981 | Knablein et al. ........ | 47/17 |
| 5,103,801 A | * | 4/1992 | Herring et al. ......... | 126/374.1 |
| 5,129,033 A | * | 7/1992 | Ferrara et al. .......... | 392/447 |
| 5,452,683 A | * | 9/1995 | Poffenroth ........... | 119/73 |
| 5,491,928 A | * | 2/1996 | Potochnik ........... | 47/79 |
| 5,501,037 A | * | 3/1996 | Aldokimov et al. ...... | 47/60 |
| 5,782,035 A | * | 7/1998 | Locke et al. .......... | 47/79 |
| 5,794,522 A | * | 8/1998 | Bois et al. ........... | 99/330 |
| 5,948,304 A | * | 9/1999 | Bradenbaugh ......... | 219/496 |
| 5,990,455 A | * | 11/1999 | Scott et al. ........... | 219/430 |
| 6,283,014 B1 | * | 9/2001 | Ng et al. ............. | 99/330 |
| 6,320,166 B1 | * | 11/2001 | Park ................ | 219/439 |
| 7,098,427 B2 | * | 8/2006 | Ducarme et al. ....... | 219/437 |
| 2005/0081441 A1 | * | 4/2005 | Mantovani ........... | 47/67 |

FOREIGN PATENT DOCUMENTS

| | | |
|---|---|---|
| DE | 39 30 948 A1 | 3/1991 |
| EP | 49608 A1 * | 4/1982 |
| GB | 2 191 924 | 12/1987 |
| GB | 2191924 A * | 12/1987 |
| JP | 64-16530 * | 1/1989 |
| JP | 02 142425 A | 5/1990 |
| JP | 2-211811 * | 8/1990 |
| JP | 5-316878 * | 12/1993 |
| JP | 2002-330641 * | 11/2002 |
| WO | WO 92/06587 * | 4/1992 |

* cited by examiner

*Primary Examiner*—Peter M Poon
*Assistant Examiner*—Kristen C Hayes
(74) *Attorney, Agent, or Firm*—Francis C. Hand; Carella, Byrne, Bain

(57) ABSTRACT

The growth container is formed of two pots that interfit within each other to define an enclosed space. A heater disposed in the space supplies heat via a reservoir of water for heating the inner pot and the soil in the inner pot to keep the roots of an aquatic plant embedded within the soil warm. A thermostat(s) is provided for maintaining the temperature of the soil at a predetermined temperature.

19 Claims, 1 Drawing Sheet

PLANT GROWTH CONTAINER

Figure 1:
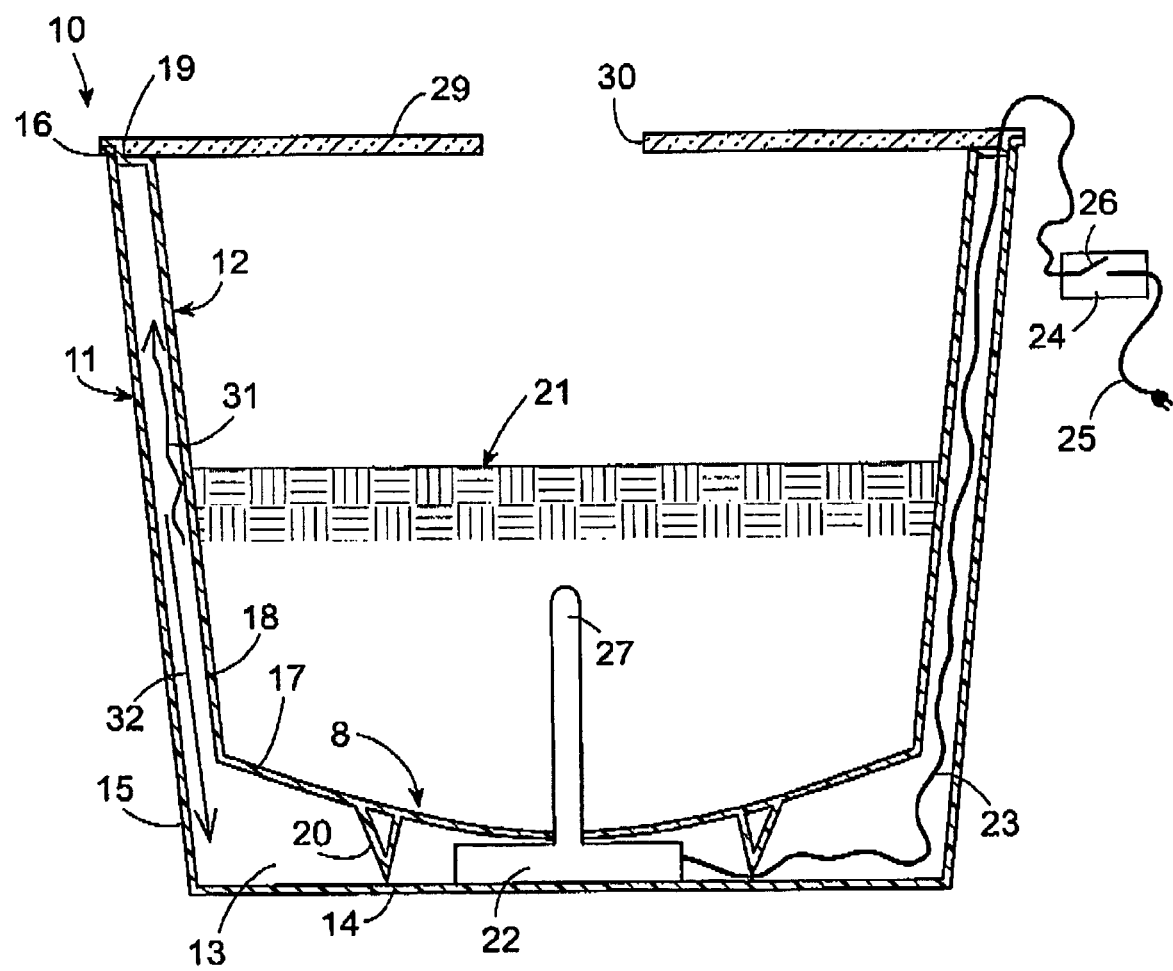

This application claims the benefit of Provisional Application No. 60/523,453 filed Nov. 19, 2003.

This invention relates to a plant growth container. More particularly, this invention relates to a plant growth container for tropical aquatic plants. More particularly, this invention relates to a plant growth container for overwintering tropical aquatic plants.

As is known, tropical aquatic plants need warmer root zones than hardy aquatic plants. The temperature of the surrounding water is not as critical if the root zone of the plant is over 70° F. That is to say, the temperature of the root zone of the plant is more critical than the actual water temperature or air temperature. In northern climates, water temperatures usually do not reach 70° F. until mid to late June. This makes for a very short season for tropical aquatic plants. In southern climates, the season is much longer but overwintering tropical aquatic plants is still difficult because many of them originate from the very tropical regions of the planet along the Equator. Even in places such as Florida, water temperatures drop below 45° F. during the winter months for short periods of time.

Typically, tropical aquatic plants are placed in ponds in a potted condition during a warm growing season. At the end of the growing season, the potted plants are usually removed from the ponds for overwintering in a warm place.

The overwintering of tropical aquatic plants is a very difficult procedure and most tropical aquatic plants are treated as annuals and discarded at the end of a season.

Accordingly, it is an object of the invention to permit the overwintering of tropical aquatic plants in an easy manner.

It is another object of the invention to be able to place tropical aquatic plants in a pond in a northern climate much earlier than the usual season.

It is another object of the invention to provide for overwintering of tropical aquatic plants in a reliable inexpensive manner.

It is another object of the invention to overwinter tropical aquatic plants from season to season.

Briefly, the invention provides a plant growth container for the overwintering of tropical aquatic plants. The plant growth container is constructed of a pair of pots that are disposed in interfitting relation to define an enclosed space therebetween with the inner one of the pots defining a cavity for receiving soil and the roots of a plant. In addition, a heating means is disposed in the space between the pots for heating the inner pot to heat the soil within the inner pot.

In one embodiment, the heating means includes a reservoir of water in the space between the pots and a heater that is disposed in the space between the pots for heating the water in the space. Upon heating of the water, heat is transmitted through the inner one of the pots into the soil in the inner pot and the roots of a plant in the soil.

The heated plant growth container serves to warm the root zone of the plant to temperatures that would be normal in the normal habitat of the plant. Thus, during an overwintering of a tropical plant, the roots are maintained in a warm environment and the plant remains healthy. After overwintering, the growth container and the plant are returned to the pond from which the plant was taken or any other pond.

The temperature of the soil within the growth container can be maintained by using a thermostat to sense the temperature of the soil and to activate the heater when the soil temperature falls below a predetermined value and to deactivate the heater when the temperature rises above a predetermined value. A pair of thermostats may also be used to allow the soil to be heated to different levels of temperature.

The growth container may be made of inexpensive materials with the outer pot being made of a heat-insulative material and the inner pot being made of a heat-transmissive material.

In other embodiments, instead of using water in the space between the pots of the growth container, use may be made of a gel that can be heated to transmit heat uniformly to the inner pot and thence into the soil therein. Also, use may be made of a thermal element that is able to be heated, for example, in the manner of an electric blanket, in order to transfer heat into the soil in the inner pot.

These and other objects and advantages of the invention will become more apparent from the following detailed description taken in conjunction with the accompanying drawing wherein:

The drawing illustrates a cross sectional view of a plant growth container constructed in accordance with the invention.

Referring to the drawing, the plant growth container 10 includes a pair of pots 11, 12 that are disposed in interfitting relation to define a space 13 therebetween for receiving water.

The outer pot 11 has a flat base 14 for seating on a support surface, an upstanding wall 15 that is of conical shape and a lip 16 that is directed radially outwardly at the top of the wall 15. The outer pot 11 is made of a heat-insulative material and is preferably made of a suitable plastic for this purpose.

The inner pot 12 has a base 17 that is spaced from the base 14 of the outer pot 11, an upstanding wall 18 that is spaced from the wall 15 of the outer pot 11 and a shouldered rim 19 at the top of the wall 18. The shouldered rim 19 fits into the outer pot 11 in a tight fit manner and overlies the lip 16 of the outer pot 11.

The base 17 of the inner pot 12 has a concave shape 8 but may be made of any other suitable shape. In addition, the base 17 has a plurality of legs 20 that depend from the underside to rest on the base 14 of the outer pot.

The inner pot 12 defines a cavity for receiving soil 21 and the roots (not shown) of a tropical aquatic plant.

A heater 22 is disposed in the space 13 between the base 14 of the outer pot 11 and the base 17 of the inner pot 12 for purposes of heating the water within the cavity 13. As illustrated, the heater 22 is of an electrical type and is electrically connected by a line 23 to a transformer 24 that can be plugged into a suitable source of electrical energy via a line 25.

The transformer 24 includes a normally open switch 26 that selectively energizes the transformer 24 for delivering electrical energy via the line 23 to the heater 22.

A thermostat 27 is mounted on the heater 22 and passes upwardly through an opening in the base 17 of the inner pot 12 into the cavity defined by the inner pot 12 for sensing the temperature of the soil 21 therein. This thermostat 27 is operatively connected to the switch 26 of the transformer 24 for selectively actuating the switch 26 in response to sensing of a soil temperature below a predetermined temperature, e.g. 70° F.

The growth container 10 also has a cover 29 that is mounted within a recess of the shouldered rim 19 of the inner pot 12. The cover 29 is provided with at least one opening 30, for example a central opening, for passage of a plant therethrough so that the roots of the plant may be imbedded within the soil 21.

The cover 29 is made of an insulation material in order to keep heat in the growth container 10 and to concentrate the heat towards the center of the container 10 where the plant is growing.

When in operation, the heater 22 is energized to heat the water within the cavity 13 between the two pots 11, 12. As the water is heated about the heater 22, the water begins to circulate within the cavity 13 by moving upwardly along the outside of the inner pot 12 as indicated by the arrow 31 to warm the base 17 and upstanding wall 18. Since the inner pot 12 is made of a heat-transmissive material, heat is transmitted into the soil 21 and thus into the roots of a plant therein.

The cooled portion of the water will flow downwardly along the inside of the outer pot 11 as indicated by the arrow 32. Since the outer pot 11 is made of a heat-insulated material, the generated heat will be retained within the growth container 10.

The thermostat 27 serves to regulate the temperature of soil, for example, at 70° F. or at 85° F. depending upon the thermostat used. Thus, should the temperature of the soil drop below the predetermined value, the thermostat switch 26 will close and the transformer 24 will deliver electrical energy to the heater 22 to heat the water in the cavity 13 in order to increase the temperature of the soil. Once the temperature of the soil has reached the predetermined value, the thermostat would open the switch 26 to thereby shut off the heater 22.

The inner pot 12 is readily replaceable within the outer pot 11 and can be made of any suitable heat-transmissive plastic material.

Initially, a tropical aquatic plant or any other suitable plant is potted in the soil 21 of the growth container 10. The container 10 is then placed in a pond during the normal growing season for enjoyment of the plant until the time arrives for overwintering of the plant.

In order to overwinter the plant outside the pond, the growth container is removed from the pond and placed in a protected area, for example indoors. At that time, the transformer 24 is plugged into an electrical outlet (not shown). Once the thermostat 27 sends a signal that the temperature of the soil 21 in the container 10 has fallen below a predetermined value, e.g. 70° F., the heater 22 is activated. The water in the cavity 13 is then heated and begins to move by convection along the outside of the wall 18 of the inner pot 12 thereby warming the soil 21 to the desired temperature and in a uniform manner. The soil 21 is thus maintained at the desired temperature to keep the roots of the plant warm.

After overwintering, the growth container 10 may be placed in an environment to acclimate the plant to the outside temperatures. Thereafter, the container 10 can be returned to the pond from which the container 10 was originally taken or placed in another pond. Alternatively, the growth container 10 may be placed directly into a pond.

In order to overwinter the plant while in a pond, the transformer 24 is plugged into an electrical outlet (not shown) and the soil 21 is heated as above described.

The growth container may be constructed to provide two temperature zones to heat the roots of an embedded tropical plant. The higher heat zone will provide the extra heat required for early in a season when plants are first set out in Northern climates and for a boost of heat in Southern climates. In dormant periods, the lower setting for the heat zone can be used to maintain adequate warmth to the plant and to prevent the plant from winter kill.

Northern climates will require the growth container to be set inside a house and filled with water with a lower heat setting to maintain sufficient heat for keeping the plant alive over the winter. In Southern climates, the growth container 10 can remain in a pond all winter at the lower setting. During the peak summer months, the heater 22 of the growth container 10 can be unplugged until the weather cools.

The invention thus provides a heatable growth container that can extend the growing season of tropical aquatic plants, such as tropical water lilies, by eight or more weeks. In this respect, the growth container will winter tropical plants, particularly water lilies, indoors by maintaining the proper root zone temperature in northern climates.

The growth container may be used in southern climates to winter tropical water lilies outdoors that are not otherwise able to do so. For example, in area zone 9, tropical water lilies winter fine but in zone 7-8, the lilies will freeze out. The heated growing container will maintain the proper root zone temperature to ensure that the plants stay alive until the next growing season.

The use of the growth container allows freshly transplanted water lily tubers or bare root plant material to establish much quicker than planting in a traditional growing container.

The growth container allows a plant that has been potted therein to attain a larger size and to produce more flowers than a plant put into a traditional growing container.

The growth container allows heat to be uniformly transmitted to the soil in the inner pot and, thus, eliminates the occurrence of hot spots in the soil.

What is claimed is:

1. A plant growth container comprising
    inner and outer pots disposed in interfitting relation about upper ends thereof to define a space therebetween, the inner one of said pots defining a cavity for receiving soil and the roots of a plant and wherein the outer one of said pair of pots has an upstanding wall and said inner one of said pair of pots has an upstanding wall with a shouldered rim fitting within said upstanding wall of said outer one of said pair of pots in a tight fit manner;
    heating means in said space between said pots for heating said inner pot to heat the soil within said inner pot and to maintain the roots of the plant warm; and
    a thermostat mounted within said cavity of said inner one of said pots for sensing the temperature of the soil thereat and being operatively connected to said heating means for selectively actuating said heating means in response to sensing of a predetermined temperature of the soil.

2. A plant growth container as set forth in claim 1 wherein said heating means includes a reservoir of water in said space and a heater disposed in said space and operatively connected to said thermostat for heating said water whereby heating of the water in said space transmits heat through the inner one of said pots into the soil in said inner pot and the roots of a plant in the soil.

3. A plant growth container comprising
    an outer pot having a first base and a first upstanding wall defining a cavity;
    an inner pot having a second base and a second upstanding wall defining a cavity for receiving soil and the roots of a plant, said inner pot being disposed within said outer pot to define a space for receiving water between said first upstanding wall and said second upstanding wall and between said first base and said second base;
    a heater disposed in said space between said outer pot and said inner pot for heating water in said space whereby heating of the water in said space transmits heat through said second upstanding wall into the soil in said inner pot and the roots of a plant in the soil; and
    a thermostat mounted on said heater and passing through said second base of said inner pot into said cavity of said inner pot for sensing the temperature of the soil thereat and being operatively connected to said heater for selectively actuating said heater in response to sensing of a predetermined temperature.

4. A plant growth container as set forth in claim 3 wherein said outer pot is made of a heat-insulative material and said inner pot is made of a heat-transmissive material.

5. A plant growth container as set forth in claim 3 further comprising a transformer connected to said heater for delivering electrical energy thereto, a switch for selectively energizing said transformer for delivering electrical energy to said heater, said thermostat being operatively connected to said switch for selectively actuating said switch in response to sensing of a predetermined temperature.

6. A plant growth container as set forth in claim 3 further comprising a cover mounted on said inner pot over said cavity, said cover having at least one opening for passage of a plant therethrough.

7. A plant growth container as set forth in claim 3 wherein said inner pot has a plurality of feet on said second base spacing said second base from said first base of said outer pot.

8. A plant growth container as set forth in claim 3 wherein said second base is concave.

9. A plant growth container comprising
an outer pot having a first base and a heat-insulative upstanding wall defining a cavity;
an inner pot having a second base and a heat-transmisive upstanding wall defining a cavity for receiving soil and the roots of a plant, said inner pot being disposed within said outer pot to define a space for receiving water between said first upstanding wall and said second upstanding wall and between said first base and said second base;
a heater disposed in said space between said outer pot and said inner pot for heating water in said space whereby heating of the water in said space transmits heat through said heat-transmissive upstanding wall of said inner pot into the soil in said inner pot and the roots of a plant in the soil; and
a thermostat mounted within said cavity of said inner pot for sensing the temperature of the soil thereat and being operatively connected to said heater for selectively actuating said heater in response to sensing of a predetermined temperature of the soil, said thermostat being mounted on said heater and passing through said second base of said inner pot.

10. A plant growth container as set forth in claim 9 further comprising a transformer connected to said heater for delivering electrical energy thereto, a switch for selectively energizing said transformer for delivering electrical energy to said heater, said thermostat being operatively connected to said switch for selectively actuating said switch in response to sensing of a predetermined temperature.

11. A plant growth container as set forth in claim 10 further comprising a cover mounted on said inner pot over said cavity, said cover having at least one opening for passage of a plant therethrough.

12. A plant growth container as set forth in claim 10 wherein said inner pot has a plurality of feet on said second base spacing said second base from said first base of said outer pot.

13. A plant growth container as set forth in claim 12 wherein said second base is concave.

14. A plant growth container as set forth in claim 9 further comprising a cover mounted on said inner pot over said cavity, said cover having at least one opening for passage of a plant therethrough.

15. A plant growth container as set forth in claim 9 wherein said inner pot has a plurality of feet on said second base spacing said second base from said first base of said outer pot.

16. A plant growth container as set forth in claim 15 wherein said second base is concave.

17. A plant growth container as set forth in claim 9 wherein said second base of said inner pot is concave.

18. A plant growth container comprising
inner and outer pots disposed in interfitting relation to define an enclosed space therebetween, the inner one of said pots defining a cavity and wherein the outer one of said pots has an upstanding wall and said inner one of said pots has an upstanding wall with a shouldered rim fitting within said upstanding wall of said outer one of said pots in a tight fit manner;
a layer of soil in said cavity of said inner pot for receiving the roots a plant;
heating means in said space between said pots for heating said inner pot to heat said soil within said inner pot; and
a thermostat mounted within said inner pot for sensing the temperature of the soil thereat and being operatively connected to said heating means for selectively actuating said heating means in response to sensing of a predetermined temperature.

19. A plant growth container as set forth in claim 18 further comprising a cover mounted within said rim and a lip directed radially outwardly at the top of said upstanding wall of said outer one of said pots and wherein said rim overlies said lip.

* * * * *